United States Patent [19]
Rogan

[11] 3,902,043
[45] Aug. 26, 1975

[54] APPLIANCE FOR HEATING AND APPLYING DENTAL WAX

[76] Inventor: Virgil Kenneth Rogan, 1500 Nevada, Baytown, Tex. 77520

[22] Filed: July 19, 1973

[21] Appl. No.: 380,855

[52] U.S. Cl. .................. 219/242; 32/70; 219/230; 219/238; 219/421; 219/433; 219/479; 219/521
[51] Int. Cl.² .. H05B 1/00; A61C 9/00; F27B 14/06
[58] Field of Search ........ 32/70; 219/221, 227, 229, 219/230, 231, 233, 236–242, 385, 415–419, 420–427, 428, 433, 521, 472–479, 429; 222/146 HE, 146 R; 239/133–136; 401/1, 2

[56] References Cited
UNITED STATES PATENTS

| | | | |
|---|---|---|---|
| 1,144,981 | 6/1915 | Lightfoot | 219/242 UX |
| 1,264,174 | 4/1918 | Furber | 219/475 |
| 1,396,957 | 11/1921 | Heidbrink | 219/421 |
| 1,560,893 | 11/1925 | Bonoff | 219/421 UX |
| 1,759,832 | 5/1930 | Banff | 219/478 UX |
| 2,379,504 | 7/1945 | Thompson | 219/417 X |
| 2,468,818 | 3/1949 | Fox et al. | 219/238 X |
| 3,091,233 | 5/1963 | Dunlap | 222/146 HE |
| 3,345,497 | 10/1967 | Porteous | 219/428 X |
| 3,800,122 | 3/1974 | Farmer | 219/242 X |

FOREIGN PATENTS OR APPLICATIONS

| | | | |
|---|---|---|---|
| 76,810 | 2/1948 | Czechoslovakia | 219/233 |
| 828,004 | 2/1960 | United Kingdom | 219/238 |

*Primary Examiner*—A. Bartis
*Attorney, Agent, or Firm*—Ranseler O. Wyatt

[57] ABSTRACT

A dental tool for use in applying hot molten wax to denture patterns and the like includes a cabinet having an electrical power supply and a pair of separate, covered, compartments. A selectively energized electrical circuit is provided in each compartment and connected to the power supply. The circuit in the first compartment supplies current to an electrically heated wax applicator tool having detachable tips. The cover over the first compartment is provided with a tool holder for receiving and holding the applicator tool. The circuit in the second compartment supplies current to an electric heater in the compartment associated with wax containing pots mounted in the cover and extending into the second compartment. The circuit in the second compartment includes a thermostat for controlling the temperature of the pots. Signal lights are provided for indicating the state of energization of the respective circuits.

1 Claim, 10 Drawing Figures

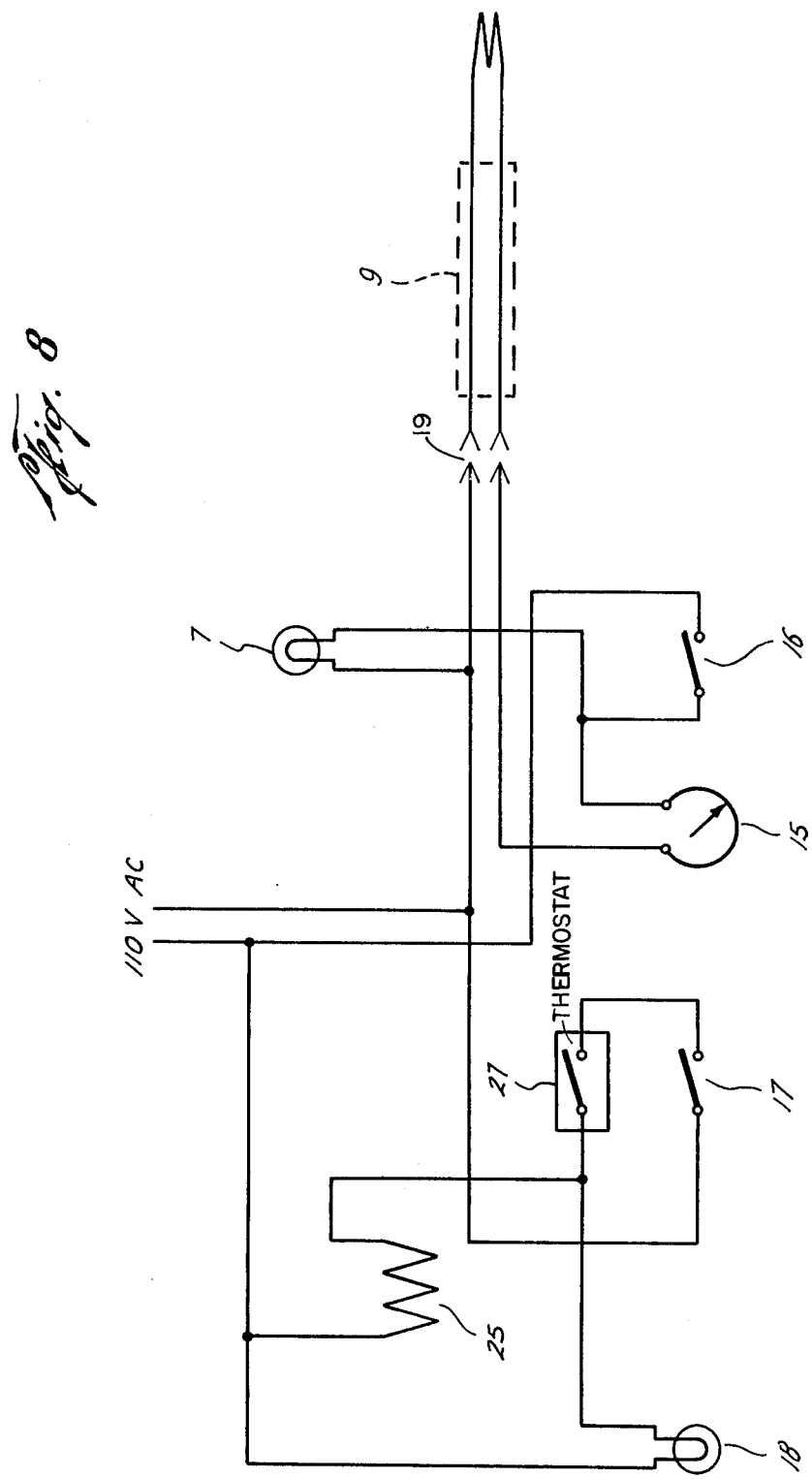

3,902,043

APPLIANCE FOR HEATING AND APPLYING DENTAL WAX

BACKGROUND OF THE INVENTION

In dental offices and laboratory work, application of wax to dentures, forms and patterns is a daily chore, including forming patterns for gold inlays, crowns and applying or smoothing wax for artificial dentures. This is accomplished, at this time, by heating wax in the office over an electric plate, or the like, and employing a bunsen burner, or the like to heat a spatula for applying or working the wax. The heat from such activities tends to heat the office and requires considerable space and requires time to heat the wax between jobs, and in the event the temperature is not exact, a danger of burning the wax, or of difficulty in applying a wax that is not not enough for ready application, is present.

SUMMARY OF THE INVENTION

A tool for use in dental work having means for heating and maintaining a desired degree of heat to a plurality of wax containers and having an applicator and detachable blades for said applicator, and means in said applicator for heating and maintaining said blades at a desired degree of heat.

BRIEF DESCRIPTION OF THE DRAWINGS

FIG. 8 is an electrical diagram of the circuit employed.

DESCRIPTION OF THE PREFERRED EMBODIMENT

Figure 1:
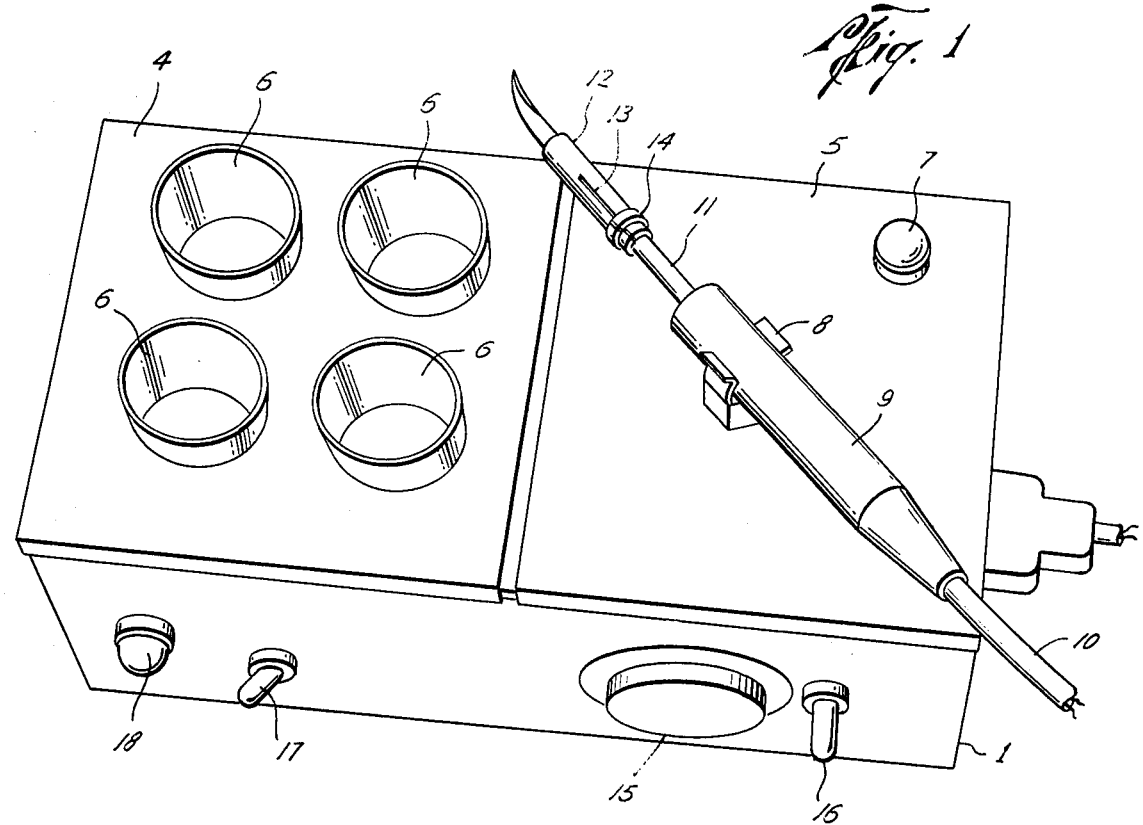
FIG. 1 is a top plan view of the device.
Figure 2:
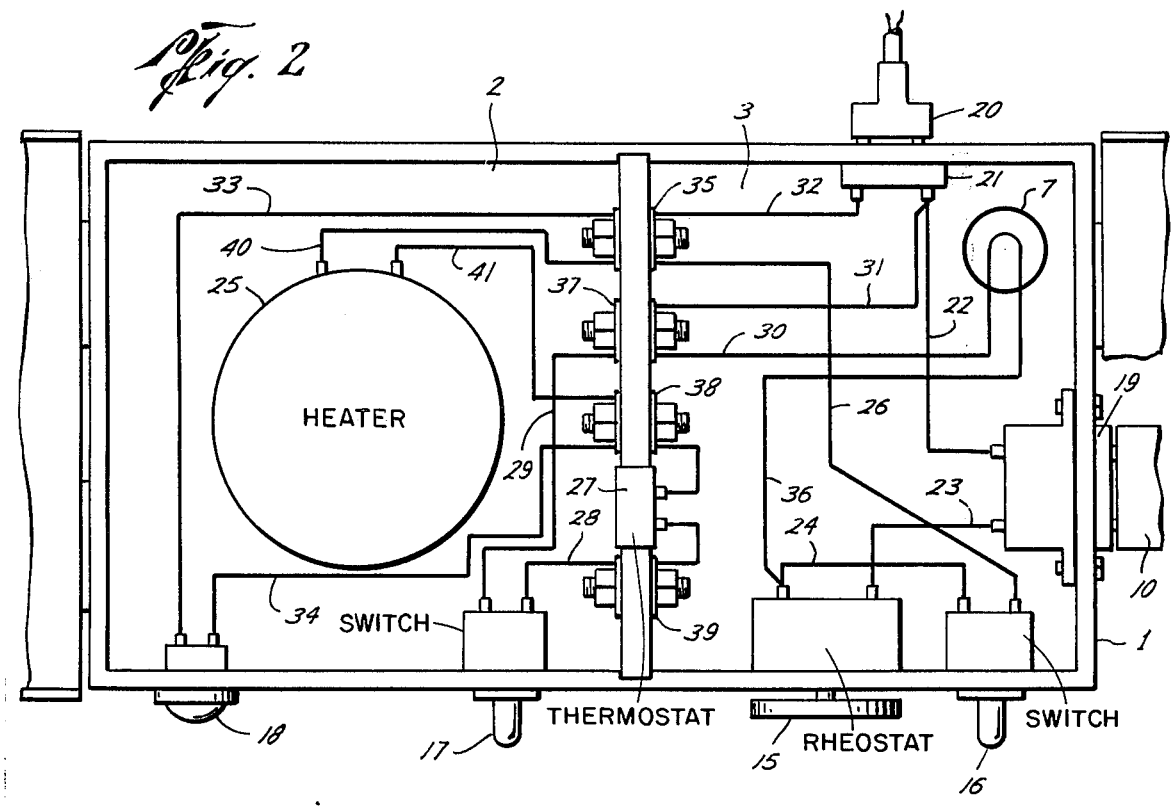
FIG. 2 is a top view of the wiring circuit employed in the device.
Figure 3:
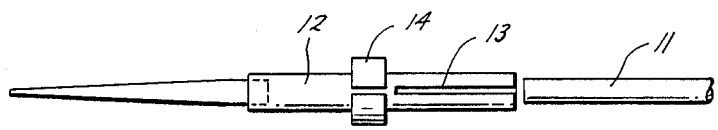
FIG. 3 is a side elevational view of one blade employed, showing the blade detached.
Figure 4:
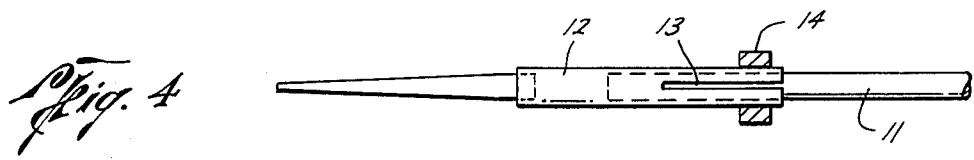
FIG. 4 is a side elevational view of the blade shown in FIG. 3, showing the blade attached.
Figure 5:
FIG. 5 is a side elevational view of another type of blade.
Figure 5A:
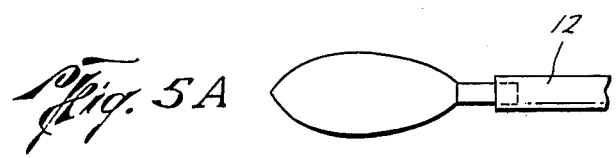
FIG. 5A is a top view of the view shown in FIG. 5.
Figure 6:
FIG. 6 is a side elevational view of another type of blade.
Figure 6A:
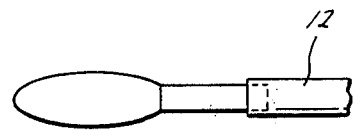
FIG. 6A is a top view of the view shown in FIG. 6.
Figure 7:
FIG. 7 is a side elevational view of another type of blade employed.

In the drawings, the numeral 1 designates a cabinet of metal, or other rigid material, having two compartments 2, 3 and a lid as 4, 5 on each compartment. Mounted in the lid 4 are the respective wax pots 6, 6 and in the lid 5 is mounted the signal light 7 and the applicator tool holder 8 in which the applicator tool handle 9 is detachably mounted. The applicator tool consists of a tubular handle 9 having the electric cord 10 connected into one end and the heating element housing 11 connected into the other. The blade holder 12 has the desired blade mounted in one end and is splined on the other end as at 13. the Splined end is telescoped on to the extended end of the housing 11, and the annular member 14 moved to the position adjacent the end of the splined portion 13, as shown in FIG. 4, to hold the blade holder 12 in place. To detach the blade holder 12, the annular member 14 is moved off of the splined area, as shown in FIG. 3, and the housing 11 withdrawn.

A rheostat 15 mounted on the housing 1 provides variation of the heating intensity to the applicator blade. A switch 16 controls the flow of current to the heating element in the applicator and the switch 17 controls the flow of current to the pots 6. A signal as the light 18 warns when the heating element to the pots is on. The cord 10 is plugged into the electrical circuit in the chamber 3 by means of the receptacle 19. The cord 20, from the source of electrical power, is connected into the electrical circuit through the receptacle 21.

In the chamber 3, the electrical energy from the source of power flows in through the receptacle 20 and is divided into two circuits. A series of connecting poles are mounted between the chambers 2, 3. The electric power comes into the receptacle 21 and through line 22 to the applicator cord receptacle 19 and through the line 23 to the rheostat 15, and through line 24 to the switch 16 and through line 26 to the connecting pole 35, and through line 32 to complete the circuit. A line 36 extends from the line 24 on the opposite pole of the rheostat 15 to the signal light 7 and a circuit is completed through wire 31, pole 37, wire 30, line 7, wire 36, switch 16, wire 26, pole 35 and wire 32. In the chamber 2, the electrical energy comes through line 32 from the source of power to pole 35 and through pole 35 to line 33, where it travels through signal light 18 and through line 34 to the connecting pole 38, through the thermostat 27 and connecting pole 39 and the line 28 to the switch 17, through switch 17 to the connecting pole 37; and completed through line 31. The switch 17 connects the heater 25 into the circuit by connection of the line 40 to the pole 35 and into the heater 25 and line 41 leading from the heater 25 to the pole 38 where it travels through the thermostat 27, through the line 28 to the switch 17.

In use the cord 20 is plugged into the usual 110 voltage ciruict and the switch 16 turned to "on" position. If the applicator tool is to be used by itself, when it has heated to the preset degree, by means of the rheostat 15, the user may use the tool at will, the desired blade having been mounted on the housing 11. If wax is to be used, the switch 17 is turned to "on" position, and the wax will be heated and maintained at the preselected temperature determined by the thermostat 27. When different blades are required, annular member 14 is moved outwardly over the splined area 13 and the housing 11 withdrawn from the blade holder, and a new blade holder with the desired blade mounted therein replaced by telescoping the holder onto the housing 11, and moving the annular member 14 rearwardly over the splined area. The pots 6 may contain the various types of wax commonly used in dental work, and by leaving the unit "on" will always be ready for use when needed by the dentist or laboratory technician at exactly the desired temperature.

What I claim is:

1. In a dental tool, a cabinet having electrical power supply means associated therewith, two separate compartments in said cabinet, an electrical circuit in each of said compartments connected with the power supply means in the cabinet, a cover on said cabinet covering each of said compartments, an electrically heated wax applicator tool having detachable tips, means on said cabinet for selectively activating each circuit, one circuit associated with one compartment providing controlled current flow to the applicator tool for heating a tip detachably mounted on said applicator tool and the circuit associated with said other compartment providing controlled current flow to an electrical heater associated with wax containing pots mounted in the cover of said other compartment, said other compartment housing the heating element associated with said pots, a thermostat incorporated in said other circuit for controlling the temperature of said pots, a tool holder mounted on the cover over said one compartment and adapted to receive and hold the applicator tool, said wax containing pots mounted in the cover over said other compartment extending therethrough into said other compartment, and signal lights on said cabinet and connected in each of the respective circuits to indicate that the applicator is energized and that the heater for the wax containers has been energized, respectively.

* * * * *